Nov. 2, 1954 — H. A. CUTTING — 2,693,093
BEARING ASSEMBLY LOCKING CLIP
Filed Dec. 7, 1951
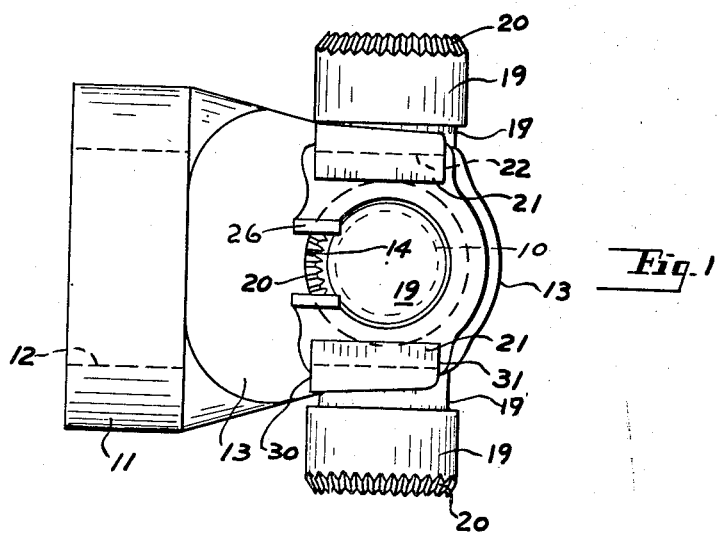
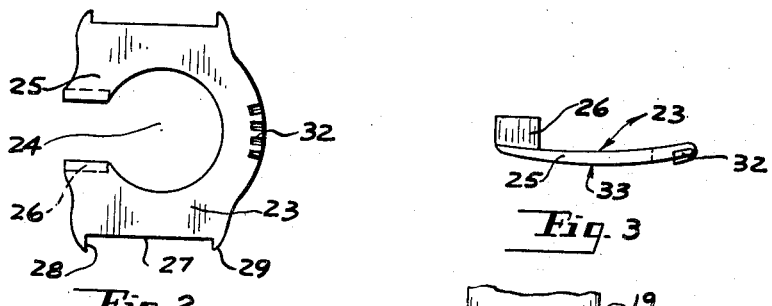
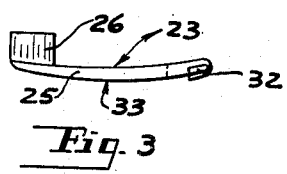
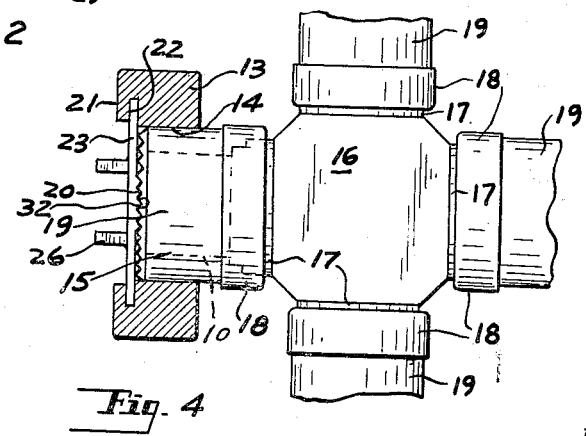
INVENTOR.
HERBERT A. CUTTING
BY
ATTORNEY.

2,693,093

BEARING ASSEMBLY LOCKING CLIP

Herbert A. Cutting, Birmingham, Mich.

Application December 7, 1951, Serial No. 260,415

4 Claims. (Cl. 64—17)

This invention relates to a bearing assembly locking clip, and more particularly to such a locking clip for use in conjunction with a universal joint.

It is the object of the present invention to provide a simplified and inexpensive locking clip construction adapted for securing a bearing assembly non-rotatively within a particular bearing support member, such as the yoke of a universal joint.

This and other objects will be seen from the following specification and claims which follow in conjunction with the appended drawing in which:

Fig. 1 is a side elevational view of the present locking clip illustrating its assembly with respect to a bearing assembly positioned within one of the yokes of a universal joint fragmentarily shown.

Fig. 2 is a front elevational view of the present locking clip.

Fig. 3 is a top plan view thereof; and

Fig. 4 is a fragmentary elevational view illustrating the positioning of the locking clip within a portion of the yoke which supports the bearing assembly upon the cross member of a universal joint fragmentarily shown.

It will be understood that the above drawing illustrates merely a preferred embodiment of the invention and that other embodiments are contemplated within the scope of the claims hereafter set forth.

Referring to the drawing, one of the yokes of a universal joint is designated by the circular member 11 in Fig. 1 having a central shaft receiving opening 12. Said yoke includes the outwardly directed parallel spaced arms 13 which are transversely apertured as at 14 for receiving the bearing assembly generally designated by the numeral 15.

While the present locking clip may be employed for engagement with any bearing assembly, the present illustration shows the same in connection with the bearing assembly associated with a universal joint.

The conventional cross member 16 of a universal joint, Figs. 1 and 4, has provided thereon a plurality of radially directed circular studs 10 which are adapted for projection loosely within the respective opposed transverse apertures of the yokes of a universal joint, for illustration. In the present embodiment of the invention, one of the studs 10 is projected through the aperture 14 of the yoke arm 13 in the manner shown in Figs. 1 and 4.

The bearing assembly includes the protective sleeve 18 which is pressed upon the shoulders 17 and arranged axially of the studs 10. Sleeve 18 is adapted to rotatively receive bearing assembly 15, whose cup 19 is positioned within yoke opening 14 and loosely within sleeve 18. Said sleeve is omitted from Fig. 1, for clarity.

Bearing cup 19 has circularly arranged serrations 20 adapted for cooperation and registry with the arcuately arranged serrations 32 upon one face of the locking clip 23, hereafter described.

The end faces of the yoke arms 13 have broached or otherwise formed therein, a pair of opposed parallel spaced slots 22, arranged in a plane at right angles to the axis of bearing assembly 15. While slots 22 are shown horizontally arranged in Fig. 1, it is contemplated that said slots could just as well be vertically arranged or at any angle.

The formed clip 23, Fig. 2, is flexible and is preferably formed of spring steel, and is adapted for slidable positioning upon the yoke arms 13 within the opposed slots 22.

Clip 23 has a central circular aperture 24 of less diameter than the diameter of bearing assembly 15 for retaining the same against longitudinal outward movement from the yoke 13.

Clip 23 has bifurcated portions 25 with the outturned flanges or ears 26 arranged in opposed relation, adjacent the opening defined by the bifurcations 25. Flanges 26 are preferably arranged at right angles to the surface of the clip 23 and provide means whereby said bifurcations may be manually flexed towards each other to permit insertion or removal of the clip 23 with respect to the slots 22.

The opposite side edges of clip 23 are slotted at 27 for a distance slightly greater than the length of end wall portions 21, which form a part of the yoke arms 13 and which bound slots 22.

Said slots define within the clip 23, the clip retaining projections 28 and 29 which are adapted to cooperatively and retainingly engage over the end wall portions 30 and 31 respectively of the members 21 whereby the clip 23 is immovably secured in position as shown in Fig. 1.

It is apparent that the serrations 32 are upon the face of the clip 23 opposite from flanges 26, and are adapted for cooperative engagement and registry with the corresponding serrations 20 formed in the end face of the bearing cup 19. Thus, there is provided a locking clip, which is mounted upon the yoke arm 13 and which is adapted to retain the bearing assembly thereon and against relative rotation with respect to said arms.

As shown in Fig. 3, the clip 23 is longitudinally arcuate and must be partially straightened out as it is projected within slots 22. This places the clip 23 under tension to thereby increase the frictional relationship of said clip with respect to the yoke 13.

For inserting clip 23 within the slots 22, the flanges 26 are brought together slightly by a suitable tool to permit the projections 28 to fit within the slots 22. Thereafter, the clip 23 is tapped into place or moved longitudinally until the projections 28 pass the edges 30 of the portions of the yoke arms 13 defining the slots 22, at which moment the projections 28 will resiliently snap into the locking position shown in Fig. 1. At the same time the locking projections 29 cooperatively bear against the edges 31 on the opposite side of the slot bounding elements 21, to thus limit the inward movement of the clip within said slots.

By the above construction, the clip 23 is effectively secured in position within the slots 22 and is retained therein against accidental dislodgment.

Having described my invention, reference should now be had to the claims which follow for determining the scope thereof.

I claim:

1. A clip comprising a U-shaped body member, the side of each leg of the U being recessed to provide laterally extending prongs.

2. A clip comprising a U-shaped body member, the side of each leg of the U being recessed to provide laterally extending prongs, and upstanding opposed ears upon the ends of said legs.

3. A clip comprising a U-shaped body member, the side of each leg of the U being recessed to provide laterally extending prongs, and upstanding opposed ears upon the ends of said legs, the bight portion of said body being serrated.

4. A clip comprising a U-shaped body member, the side of each leg of the U being recessed to provide laterally extending prongs, and upstanding opposed ears upon the ends of said legs, the bight portion of said body being serrated, said body being arcuately formed along its longitudinal axis.

References Cited in the file of this patent

UNITED STATES PATENTS

| Number | Name | Date |
|---|---|---|
| 1,362,215 | Appelt | Dec. 14, 1920 |
| 2,114,861 | Slaght | Apr. 19, 1938 |
| 2,131,948 | Graham | Oct. 4, 1938 |
| 2,512,690 | Smith et al. | June 27, 1950 |
| 2,544,631 | Heimann et al. | Mar. 6, 1951 |